Oct. 17, 1961 A. P. LIMBACH 3,004,284
APPARATUS FOR STRETCHING PLASTIC MATERIAL
Filed Oct. 23, 1958 3 Sheets-Sheet 1
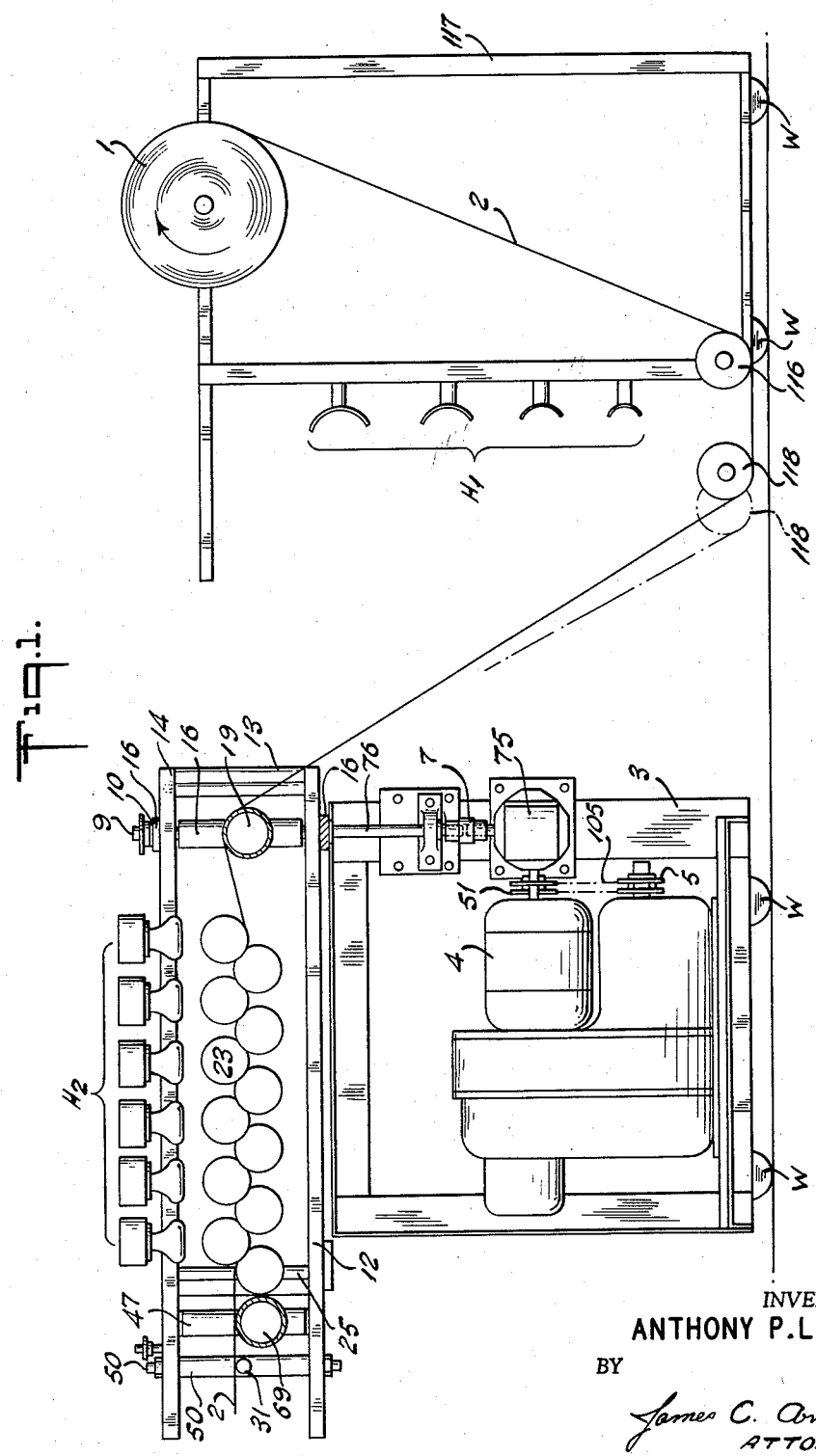
INVENTOR.
ANTHONY P. LIMBACH
BY
*James C. Amantea*
ATTORNEY

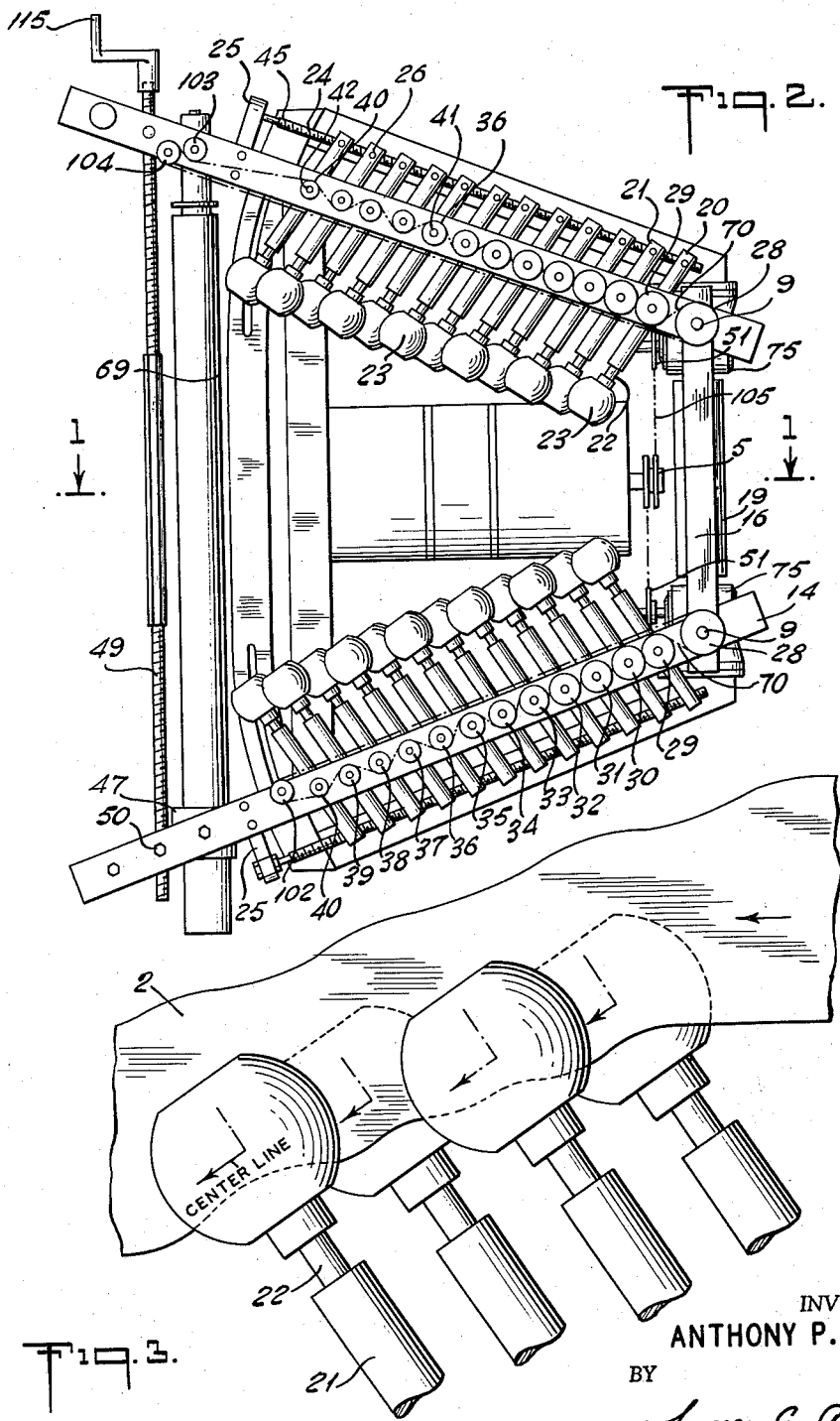

Oct. 17, 1961 A. P. LIMBACH 3,004,284
APPARATUS FOR STRETCHING PLASTIC MATERIAL
Filed Oct. 23, 1958 3 Sheets-Sheet 3
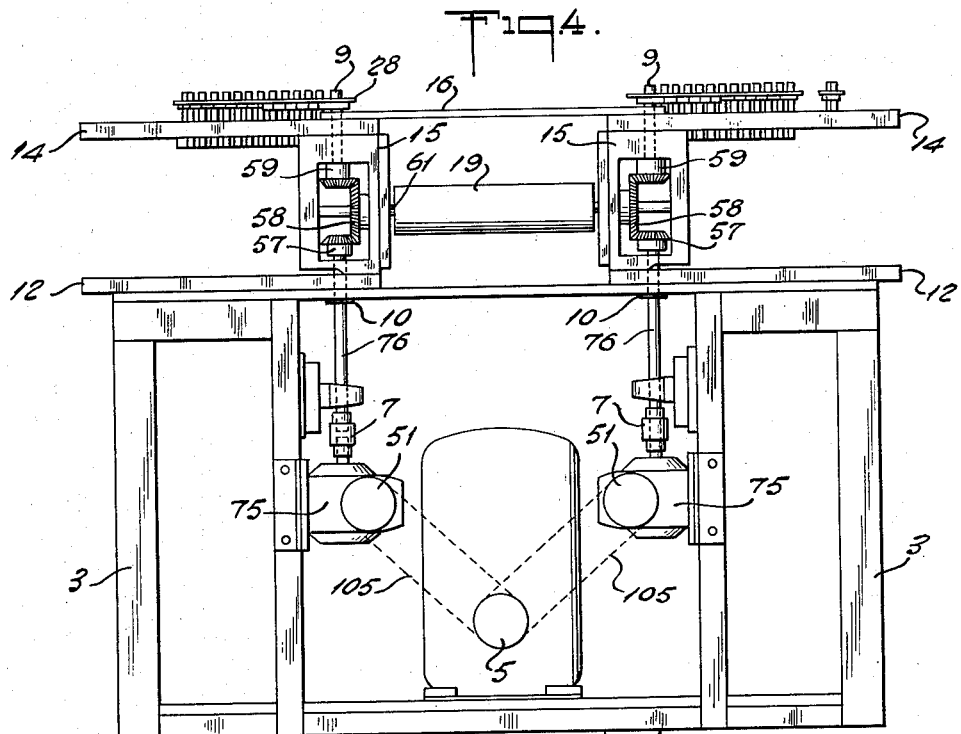
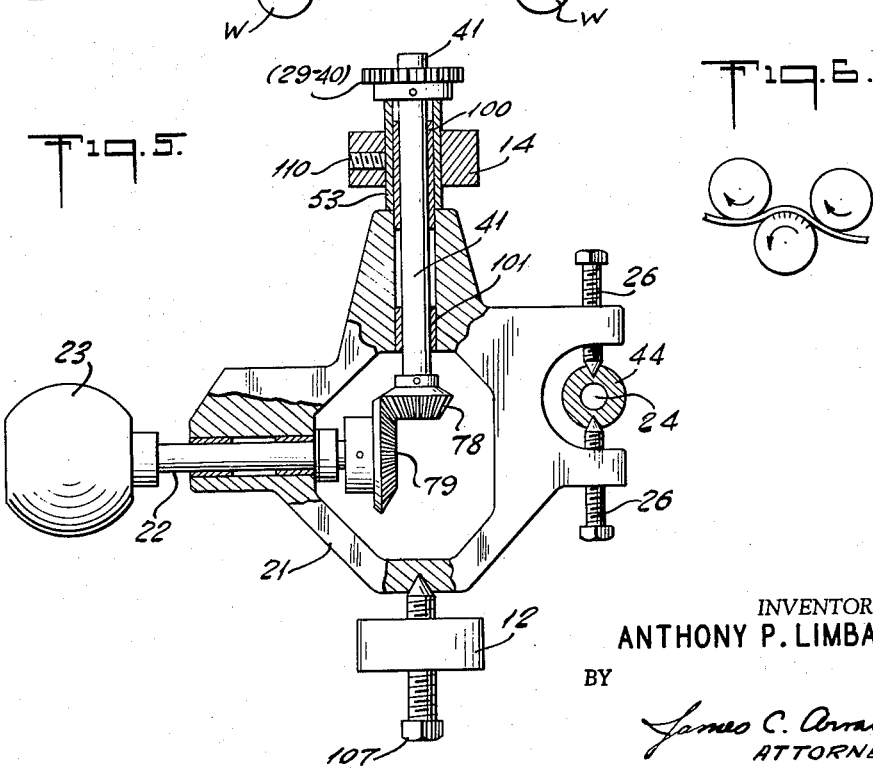
INVENTOR.
ANTHONY P. LIMBACH
BY
James C. Armantes
ATTORNEY United States Patent Office 3,004,284
Patented Oct. 17, 1961

3,004,284
APPARATUS FOR STRETCHING PLASTIC
MATERIAL
Anthony P. Limbach, New Brunswick, N.J., assignor to
Union Carbide Corporation, a corporation of New
York
Filed Oct. 23, 1958, Ser. No. 769,198
10 Claims. (Cl. 18—1)

This invention relates to a method of and apparatus for stretching plastic material. More particularly, this invention relates to a method of and apparatus for the continuous production of molecularly oriented thermoplastic flat-film or sheet material having improved strength characteristics, improved low temperature properties and improved clarity.

The mechanical properties of plastic material can be substantially improved by subjecting the material to a stretching operation, at suitable temperatures, whereby the molecules of the polymer are oriented in the direction or directions in which the stress has been applied. Thus, it has been proposed to produce molecularly oriented flat-film or sheet material by extruding a ribbon of thermoplastic material and stretching the extruded ribbon simultaneously in both the longitudinal (machine) and transverse directions.

Conventionally, biaxially stretching of flat film or sheet material has involved the engagement of the edges of the material by a clamping device or by two cooperating clamping devices which travel along a prescribed path and are intended to stretch the film material in two directions by simultaneously progressing the film at an increasing rate of speed from clamp to clamp and by drawing apart the edges of the material along divergent paths. Alternatively, there has also been used a series of stationary clamps in the form of pairs or trios of counter rotating wheels or discs positioned along a prescribed path which also progress the film from clamp to clamp at an increasing rate of speed and at the same time draw apart the edges of the film material.

Clamping devices are objectionable, however, as it has been found that a disproportionately high stress becomes concentrated in the film at and adjacent to these clamping devices thereby resulting in the tearing of the film at these points. In view of the high stress concentration in the film at and adjacent to the clamping devices, it has been extremely difficult to stretch thin film or sheet material, that is, film on the order of 10 mils or less. Such thin material easily tears at points of high stress concentration.

In addition, flat-film or sheet stretching apparatus currently in use cannot be easily and quickly adjusted in order to increase or decrease the degree of stretch, particularly in the transverse direction. Generally, it is necessary to interrupt the operation of the apparatus when any adjustment in the degree of stretch is desired. In many instances, the flat film or sheet has to be re-threaded through the apparatus after such adjustment has been made. Such interruptions are particularly undesirable as they decrease productivity and increase production costs.

It is an object of this invention, therefore, to provide a method of and apparatus for stretching plastic material wherein the disadvantages of prior methods and apparatus are substantially eliminated.

More specifically, it is an object of this invention to provide a method of and apparatus for the production of molecularly oriented thermoplastic material by biaxially stretching sheets or film of said material, at suitable temperatures, wherein there is no disproportionately high stress concentration at any point in the material.

Additionally, it is an object of this invention to provide a method of and apparatus for the production of molecularly oriented thermoplastic sheet or film material having improved strength characteristics in both the longitudinal (machine) and transverse directions.

Another object of this invention is to provide an apparatus for stretching plastic material which has novel edge-engaging means which can be adjusted to vary the degree of stretch of the sheet or film material while the apparatus is in operation wherein the apparatus is particularly advantageous in stretching thin film of plastic material, i.e. on the order of 10 mils or less.

Accordingly, these and additional advantages are derived primarily from the unique film or sheet edge progressing means of the present invention whereby each edge of a plastic film or sheet is progressed forward and laterally by a series of driven, counter rotating, convex, curvilinear surfaces positioned in special arrangement such that the edges of the plastic material are brought into contacting engagement with and are frictionally driven by the rotating surfaces but are not clamped therebetween, and the edges of the plastic material are fed behind the center of each succeeding surface as defined by a plane passing through the center of each surface and forming an angle of 90° with respect to the axis of rotation thereof.

The positively driven, counter rotating convex, curvilinear surfaces are angularly adjustable with respect to the longitudinal center line of the traveling film which is being stretched and are positioned in non-contacting arrangement with their centers lying alternatively below and above the horizontal plane defined by the travelling film.

The travelling film is progressed by the aforementioned surfaces along a prescribed path whereby the film is threaded over and under successive surfaces and can be simultaneously stretched in both the longitudinal (machine) and transverse directions.

The present invention provides a method of and apparatus for stretching film or sheets of plastic material wherein no disproportionately high stress concentrations are developed at any point in the film. Furthermore, films as thin as 2 mils or less have been stretched satisfactorily to produce good quality film of as low as 0.2 of a mil thick.

Further objects and advantages of this invention will be readily apparent from the following specification and from the accompanying drawings which depict one embodiment of the novel apparatus for performing the novel method and in which:

FIGURE 1 is a diagramamtic view, inside elevation on reduced scale taken on line 1—1 of FIGURE 2 of apparatus embodying the invention;

FIGURE 2 is a diagrammatic view on a reduced scale in top plan of apparatus embodying this invention;

FIGURE 3 is a fragmentary view in elevation of the novel film or sheet edge-engaging means of this invention;

FIGURE 4 is a front elevation of apparatus embodying the present invention;

FIGURE 5 is a view showing a driving means for the novel film or sheet edge-engaging means of this invention;

FIGURE 6 is a partial elevational showing of the novel film or sheet edge-engaging means of this invention.

It will be seen by referring to the aforementioned drawings that the principal parts of the apparatus include a series of spaced, counter rotating, convex, curvilinear surfaces which in the embodiment shown in the aforementioned figures are balls 23.

Referring specifically to FIGURE 1 wherein one embodiment of the present invention is shown, thermoplastic film or sheet material 2 is drawn from a stock roll 1 which is mounted on a portable frame 117 having wheels W. The flat thermoplastic film material 2 can also be delivered directly from an extruder, calender, or casting apparatus, travelled to the stretching apparatus and stretched according to the present invention. The thermoplastic film 2 drawn from stock roll 1 is passed under guide roll 116 and guide roll 118. Guide roll 118 is axially adjustable to provide desired clearance between the film 2 and radiant heaters $H_1$. Stock roll 1 being mounted on a portable frame 117 can also be positioned, as desired, to provide for proper clearance between the thermoplastic film 2 and the radiant heaters $H_1$ as the film 2 is being fed into the stretching area. The thermoplastic film 2 is drawn under axially adjustable guide roller 118 and over driven roll 19 which controls the rate of feed of the thermoplastic film 2 to the stretching area.

As the film is being drawn from axially adjustable guide roller 118 to the driven roll 19 it is heated to an appropriate stretching temperature by a series of radiant heaters $H_1$ which are also mounted on the portable frame 117.

In the stretching area the thermoplastic film 2 is maintained at an appropriate and desired temperature by a series of overhead radiant heaters $H_2$. In addition, reflector plates (not shown) can be positioned directly below the stretching area thereby, in effect, encompassing the entire stretching area in an oven.

The stretching area, one embodiment of which, as is shown in FIGURES 1 and 2, comprises two series of counter rotating driven balls 23, one series for each edge of the thermoplastic film 2, which progress and stretch the travelling film 2. The driven balls 23 in each series are mounted on a pivotable frame having upper frame members 14 and lower frame members 12 which pivot freely around shafts 9 and 76 as a single unit which is rigidly held together by plates 13 and stops 25. Each series of rotating balls 23 can, therefore, be angularly adjusted and positioned, as desired, with respect to the longitudinal center line of the incoming travelling film 2. The rotating balls 23 are mounted on the pivotable frame so that they are in non-contacting arrangement with each other with their centers lying alternatively above and below the horizontal plane defined by the travelling film 2. This feature is clearly shown in FIGURE 6.

Each individual ball 23 is attached to frame members 14 and 12 by means which are clearly shown in FIGURE 5. Each rotating ball 23 is mounted on a shaft 22 which in turn is rigidly held in yoke 21. Each yoke 21, on both sides of the apparatus, is attached to upper frame members 14 through a shaft 41 onto which yoke 21 is rotatably mounted. Each yoke 21 is held on shaft 41 by means of top bearing 100 and lower bearing 101 and is held in bottom frame member 12 by means of bottom set screw 107. Steel sleeve 53 holds the top bearing 100 in place and also acts as a vertical positioning means for the yoke 21. The steel sleeve 53 is held in upper frame member 14 by a set screw 110.

Each yoke 21 can be adjusted vertically by moving sleeve 53 and set screw 107. Vertical adjustment fixes the clearance between balls 23 and is generally set before the apparatus is put in operation. Once ball clearance is set, it generally does not require any further changing. Ball clearance is generally made large enough to pass a wrinkle or fold in the material once the apparatus is threaded. For film having a thickness of 7 mils a ball clearance of ⅛ of an inch, as shown in FIGURE 6, is sufficient.

Each yoke 21 is also attached to a pivotable collar 44, clearly shown in FIGURE 5, through which passes a rotatable screw 24 rigidly held by collar 44, by two pointed screws 26. Thus, as the screw 24 is rotated all of the yokes 21 change angle with respect to the frame members 12 and 14. The angle of each yoke 21 is so adjusted that each ball 23 which is rigidly connected to each yoke 21 by means of shaft 22 is positioned to feed the edge of the travelling film behind the center of the succeeding ball as shown in FIGURE 3, the center of each ball 23 being defined by a plane passing through the center of each ball and forming an angle of 90° with respect to the axis of rotation thereof. Such an arrangement compensates for the snapback of the film as it is progressed from ball to ball through the stretching area. This arrangement insures that the film does not snap or pull off of any of the balls 23. The yoke adjustment with respect to change in angle can be made while the machine is in motion.

Each end of screw 24, furthest from the feed-in point of the travelling film 2 to the apparatus, is mounted in stops 25. An oversized hole in each stop 25 permits the screw 24 to shift sideways as the yokes 21 change angles.

Each ball 23 is individually driven by its own sprocket. Sprockets are numbered 29 to 40 and are more clearly shown in FIGURE 2. Each sprocket drives its shaft 41 which rotates bevel gear 78 as shown in FIGURE 5. Bevel gear 78 in turn drives bevel gear 79 which rotates the ball 23 through shaft 22.

A chain 70 illustrated in FIGURE 2 winding back and forth between sprockets 29 to 40 causes each succeeding sprocket and ball to be driven in opposite directions. Each sprocket, commencing with sprocket 29 has one less sprocket tooth than the preceding sprocket, thereby providing for each successive ball to run progressively faster than the preceding ball.

The degree of film stretch in the machine direction is fixed by the sprocket ratios between balls. Individual drives for each pair of opposed balls, i.e. the corresponding balls on each side of the machine would have the same drive, could also be used thereby providing for stretching in any desired amount in the machine direction as such stretching would not be dependent upon the sprocket ratios between balls. Alternatively, the surface speed of the balls could be adjusted so as to provide little, if any, stretch in the longitudinal (machine) direction. Speed of corresponding balls or surfaces in each series is the same. The number of balls or surfaces in each series is the same.

A flexible cable could also be used to drive the balls of the present assembly through a variable speed drive.

Referring specifically now to FIGURES 1, 2 and 4 wherein there is disclosed a power source and means connected therewith to drive sprockets 29 to 40 which in turn drive the balls 23, a variable speed drive (Reeves #1102) with a ¾ h.p. motor and having a 50 r.p.m. to 350 r.p.m. output is the convenient power source. The power source, mounted on a base frame 3 which also supports the stretching mechanism, has sprocket 5 which transmits power to sprockets 51 through chains 105. Sprockets 51 drive the input shafts of the right angle gear reducers 75. The output of each gear reducer 75 connects to a pivot shaft 76 through a coupling 7. On each shaft 76 is fastened a bevel gear 57 which drives bevel gear 58 which is positively locked to and drives roll 19 through shaft 61. Roll 19 being positively driven assures a controlled rate of feed of film 2 to the stretching area. Both ends of the shaft 61 from roll 19 extend through a square yoke 15. This insures proper alignment of the yoke 15 with respect to roll 19 regardless of the angle substended by frame members 12 and 14.

Power is also transmitted through gear 58 to gear 59 which is fastened to shaft 9. Attached to shaft 9 is a 32-tooth sprocket 28. Sprocket 28 transmits power to drive sprockets 29 to 40 in that order by means of chain 70. Chain 70 progresses to sprocket 102 which serves as a chain tightener and for direction reversal of chain 70. On the opposite side of the machine, a chain 70 transmits power from sprocket 28 to drive sprockets 29 through 40 and then goes from sprocket 40 to sprockets 103 and 104. Sprocket 103 drives chill roll 69 at a surface speed equal to the surface speed of the last ball. Sprocket 104 is for chain tightening and for direction reversal of chain 70.

The change of width of the stretching area is provided for by having the ball supporting frame arm assemblies comprising upper frame members 14 and lower frame members 12 arranged to pivot around shafts 9 and 76. Two cross brackets 16 maintain spacing of upper frame arms 14 and lower frame arms 12 on the feed side and provide rigidity. The brackets 16 have holes through which the bearings 10 for shafts 9 and 76 fit. Thus, as previously stated, the lower and upper frame members 12 and 14 can pivot freely around shafts 9 and 76 as a single unit which is rigidly held together by plates 13 and stops 25.

Between upper frame members 14 and lower frame members 12 is a freely rotatable screw support 50 in the form of a length of square stock with a threaded hole 31 through its center as shown in FIGURE 1. The screw support 50 connects members 14 and 12 on each side of the frame. Threaded edges of screw 49 engage the threaded center hole 31 of rotatable support 50 to positively fix the angle between the two ball assembly frames as desired. A crank handle 115 is placed at one end of screw 49. Screw 49 has right and left hand threads on its respective ends to effect machine width increases or decreases as desired with but a single rotation of crank handle 115.

Bracket 47 is a large, freely rotatable bearing through which the chill roll 69 can slip as the machine width is changed. The thermoplastic film 2 passes through the stretching area comprising, in the embodiment shown, a series of counter rotating balls 23 and is stretched therein as it travels over and under the successive balls 23. Leaving the last ball, i.e. one ball for each edge, the material passes over chill roll 69 whereby it is chilled and set in its stretched condition.

OPERATION

In the operation of the above-described apparatus for the performance of the method of the present invention, flat film such as is formed by extrusion, calendering, casting or other known methods is delivered either directly from the film forming apparatus or from a stock roll to the stretching area of the stretching apparatus.

Generally, when the film is delivered directly from the film forming apparatus it is cooled down from the normal extrusion or casting temperatures to a temperature suitable for streching. It is customary to extrude or cast the film at a higher temperature than that at which the stretching operation is performed in order to extrude or cast the polymer in as homogeneous condition as possible in order to facilitate extrusion or casting. When the film material is fed cold from a stock roll, it is heated, if necessary, to desired temperatures by any convenient means.

The exact temperature at which the plastic sheet or film is stretched is determined by the characteristics which are desired to be imparted to the film material. For example, if it is desired to biaxially stretch thermoplastic film material to orient the molecules thereof, the thermoplastic material can be stretched in its "rubbery state" wherein the material is at a temperature at which it can be molecularly oriented by a stretching operation. A detailed explanation of the "rubbery state" of polymers is to be found in the September, 1957, issue of Scientific American which is herewith incorporated by reference, with particular reference therein to the following articles: "Giant Molecules" by Herman F. Mark and "The Mechanical Properties of Polymers" by Arthur V. Tobolsky. In the "rubbery state" the molecular segments of the polymer having acquired additional degrees of vibrational and rotational freedom can be moved and oriented by imposing an appropriate stress thereon.

Alternatively, plastic material can be cold stretched in accordance with the present invention. Also, more than one film can be stretched at the same time.

The temperature of the plastic sheet or film material as it is progressed and stretched in the stretching area can be controlled by radiant heating lamps H₂ and also by heating the individual convex, curvilinear surfaces which actually progress and stretch the thermoplastic film material and/or by providing heating means below the rotating surfaces.

The rate of feed of the thermoplastic film material to the stretching area is controlled by proper adjustment of driven roll 19.

From the driven roll 19 the thermoplastic sheet or film material is fed into the stretching area comprising a series of driven, counter rotating convex, curvilinear surfaces which frictionally contact the edges of the film material and progress the edges from surface to surface. The convex, curvilinear surfaces are positioned in non-contacting arrangement with their centers lying alternatively below and above the horizontal plane defined by the travelling film. The axes of rotation of the convex, curvilinear surfaces are substantially parallel to each other and generally form an angle of slightly more than 90° with the oncoming film edge as is shown in FIGURE 3.

Staggering the surfaces so that they are in non-contacting arrangement with their centers lying alternatively below and above the horizontal plane defined by the travelling film, develops sufficient wrap and develops normal pressure on each surface by the travelling film edges so that the material is held securely, as it is being stretched, by friction and blocking. Thus, when each succeeding surface pulls on the film, it creates pressure on and normal to the previous surface and increases traction between each surface and the film edge in contact with the surface.

Staggering the convex, curvilinear surfaces in the manner described is also advantageous as the distance between contact points of the film on successive surfaces is kept to a minimum. This minimizes the lengths of unsupported portions of the film, thereby tending to eliminate splitting of the film edges.

Moreover, maintaining the convex, curvilinear surfaces in non-contacting or spaced relationship allows the edges of the travelling film material to pass therebetween without being clamped. Consequently, since the edges of the film are not clamped, there are no disproportionately high stress concentrations, at or adjacent the edges of the film which, of present, would result in a tearing of the film edges.

The surfaces are also positioned so that each film edge is fed behind the center line of each succeeding surface. This insures that the snap-back of the film as it passes from surface to surface will not cause the film to snap or pull away from any of the surfaces. The actual distance behind the center of each surface which the film edge is fed depends on a number of variables, i.e. type of plastic material, thickness of the sheet, amount of stretch being imparted and the like.

Any type of a convex, curvilinear, i.e. spheroidal, surface can be used as the edge-engaging members. For example, spheroidal barrel-shaped members can be used. In the embodiment shown in accompanying drawings, a ball arrangement was used. Each ball, mounted on yokes 4 inches apart at their centers, was 3 inches in diameter and their surfaces were approximately ⅛ of an inch apart. Grooved balls as well as matted balls can be used. In fact, any convex, curvilinear surface which does not have a sharp edge which will induce a disproportionately high stress concentration and cause film tearing can be used. At least two surfaces in each series are required, i.e. one series for each edge of the travelling plastic film.

Stretch in the transverse direction is adjustable through the frame angle, as previously explained, by mechanically rotating the crank handle 115 shown in FIGURE 2. Stretching in the machine direction (longitudinal) is controlled by the differential speeds between the balls or other edge-engaging means. In the embodiment shown in the accompanying drawings, these speeds are fixed by the sprocket sizes, the chain driving means driving each sprocket at constant velocity. Sprocket 29 has 24 teeth and each succeeding sprocket has one tooth less. This gives a stretch rate in the machine direction (longitudinal) which varies from 4.5% between balls 29 and 30 to 7.7% between balls 39 and 40. Total available stretch in the machine direction with the sprocket arrangement described is about 100%; in the transverse direction 200%. Balls or surfaces of different diameters can also be used to provide for differential speeds between balls or surfaces as is well understood by those skilled in the art.

The linear speed of the film through the apparatus, therefore, the amount of longitudinal stretch and also the amount of transverse stretch can be changed while the apparatus is in operation.

The percent stretch of thermoplastic material can be conveniently determined by cutting out small squares of the stretched material, generally of a size convenient to handle, i.e. about 3 inches on a side and heating the squares in an oven for 10 minutes at 125° C. The squares will shrink and the percent stretch is calculated from the shrinkage according to the formula:

$$\text{Percent stretch} = \frac{\text{Area before shrinkage} - \text{Area after shrinkage}}{\text{Area after shrinkage}}$$

Leaving the stretching area, the material is chilled by last roll 69 and set in its stretched position. Thereafter the material is air cooled and wound up on a spool. In lieu of air cooling the stretched sheet can be passed through a cooling water bath, or over a cooling roll.

It is also frequently desirable to anneal or temper or partially relax the stretched film to impart the desired characteristics thereto. This can be accomplished by travelling the film through a heating zone, maintained at appropriate temperatures, wherein the travelling film is dimensionally immobilized or permitted partially to shrink. This heating treatment which tends to relieve stresses in the film can be performed after the stretching operation or interspersed in the stretching operation.

To thread the apparatus a lead section of the film can be hand-carried through by tucking the edges under the rotating surfaces. Also by tucking the edges under the first of the rotating surfaces and keeping the film straight and taut, it will feed itself from surface to surface until it is completely threaded. The frames governing the degree of transverse stretch are partially closed from full width stretch during the threading operation, but this is not necessary. The width is then increased again with the film running through the machine. (The unit is usually threaded at a windup speed of 15 f.p.m.).

The method and apparatus of the present invention can be used for stretching and/or orienting any stretchable plastic film or sheet material. The present invention has particular utility for stretching thermoplastic polymers wherein the molecules thereof are oriented thereby producing material having improved physical properties.

Illustrative of thermoplastic material which can be stretched according to the present invention are the following: cellulose acetate, cellulose acetate butyrate, ethyl cellulose, methyl methacrylate polymers, nylons (both extrusion and molding grades), polyolefins such as polyethylene, polypropylene and the like.

Rigid thermoplastic polymers such as vinyl chloride polymers and styrene polymers can also be advantageously stretched according to this invention. For example, among styrene polymers and copolymers can be mentioned the following: styrene polymers and copolymers, polymers and copolymers of the homologues and anologues of styrene such as para-chlorostyrene, alpha-methyl styrene, the alkyl ring substituted styrenes such as paraethyl styrene, the vinyl naphthalenes and substituted products thereof. Among polymerizable monomeric compounds suitable for copolymerization with syrene and styrene homologues and anologues are included acrylic acid esters such as methyl methacrylate, butyl methacrylate, 2-ethyl hexyl acrylate, hexyl methacrylate, octyl methacrylate and the like; nitriles such as acrylonitrile and the like.

Illustrative of rigid vinyl chloride polymers can be noted: polyvinyl chloride, copolymers of vinyl chloride with vinyl acetate, vinylidene chloride and the like.

Film or sheet material of various thickness can be stretched according to the present invention. The invention is particularly advantageous, as previously stated, for stretching thin film of plastic material on the order of 10 mils or less.

The data in the following examples clearly illustrates the advantages derived from the present method and apparatus with respect to stretching plastic film, in particular, stretching film to a thickness of 1 mil. The film was biaxially stretched whereby the molecules of the polymer were biaxially oriented as indicated by the film's improved physical properties.

In each example the film was fed from a supply source and into the stretching apparatus at a rate of 15 feet per minute. The edge-engaging means of the stretching apparatus was a series of balls, 12 for each film edge, each ball having a diameter of three (3) inches. The differential speed of the balls and the position of the balls was adjusted to produce a film having a percent stretch as indicated in each example. The stretching temperature indicated in each example was determined in the stretching area by a standard I.C. Thermocouple.

The vinyl chloride-vinyl acetate copolymer used in Examples I and II contained about 90 percent by weight vinyl chloride and about 10 percent by weight vinyl acetate polymerized therein and had a specific viscosity of from about 0.235 to 0.270 as determined at 20° C. on a sample of 0.2 gram resin per each 100 grams nitrobenzene.

The styrene-acrylonitrile copolymer used in Example III contained about 72 percent by weight styrene and about 28 percent by weight acrylonitrile polymerized therein. This copolymer is further described in Canadian Patent No. 457,340.

*Example I*

[Type of polymer—vinyl chloride-vinyl acetate copolymer]

| | Non-Stretched | Stretched | Stretched |
|---|---|---|---|
| Type of Film | Calendered | Calendered | Calendered. |
| Thickness of Film | 7 mils | 7 mils | 7 mils. |
| Stretching Temperature | | 110–112° C | 120° C. |
| Thickness of Stretched Film. | | 1.2 mils | 1 mil. |
| Tensile Strength of Film, Both Directions (ASTM-D-882-54TC). | 8,560 | 11,100 | 11,000. |
| Percent Elongation of Film, Both Directions (ASTM-D-882-54TC). | 14 | 40 | 38. |
| Cold Cracking ° C | 25 | −45 | −45. |
| Percent Stretch at 125° C. Both Directions. | | 16 | 6. |
| Clarity (Visual Examination). | fair | excellent | excellent. |

*Example II*

[Type of polymer—vinyl chloride-vinyl acetate copolymer]

| | Non-Stretched | Stretched | Stretched |
|---|---|---|---|
| Type of Film | cast | cast | cast. |
| Thickness of Film | 5 mils | 5 mils | 5 mils. |
| Stretching Temperature | | 110–112° C | 120° C. |
| Thickness of Stretched Film. | | 1.1 mils | 0.88 mil. |
| Tensile Strength of Film, Both Directions (ASTM-D-882-54TC). | 9,020 | 11,200 | 11,000. |
| Percent Elongation of Film, Both Directions (ASTM-D-882-54TC). | 13 | 41 | 39. |
| Cold Cracking ° C | 10 | below −70 | below −70. |
| Percent Stretch at 125° C. Both Directions. | | 57 | 49. |
| Clarity (Visual Examination). | Fair | excellent | excellent. |

Example III

[Type of polymer—styrene-acrylonitrile copolymer]

|  | Non-Stretched | Stretched | Stretched |
|---|---|---|---|
| Type of Film | extruded | extruded | extruded. |
| Thickness of Film | 9 mils | 9 mils | 9 mils. |
| Stretching Temperature | | 130–135° C | 140° C. |
| Thickness of Stretched Film. | | 1 mil | 0.9 mil. |
| Tensile Strength of Film, Both Directions (ASTM–D–882-54TC). | 8,500 | 14,000 | 12,000. |
| Percent Elongation of Film, Both Directions (ASTM–D–882-54TC). | 2 | 20 | 18. |
| Cold Cracking ° C | above 100 | below −70 | 25. |
| Percent Stretch at 125° C., Both Directions. | | 57 | 16. |
| Clarity (Visual Examination). | fair | excellent | excellent. |

The polymeric material in the foregoing examples was biaxially stretched at a temperature above the second order phase transition temperature of the material and within a temperature range at which the molecules of the polymer were oriented by the stretching operation. The second order phase transition temperature of polymers can be conveniently determined by the method described in an article by Fred E. Wiley appearing in Industrial and Engineering Chemistry, Volume 34, September 1942, at page 1052 entitled "Transition Temperatures and Cubical Expansion" which is herewith incorporated by reference.

Cold crack temperature in the foregoing examples was determined by looping a 2-inch by 6-inch strip of a film back onto itself without creasing it and then administering a controlled hammer blow to the loop to effect a sharp crease in the film. Five film specimens were so tested. The cold crack temperature is the highest temperature at which all five specimens cracked or shattered when so tested.

What is claimed is:

1. In an apparatus for stretching flat plastic material, edge-engaging means for progressing and stretching said material comprising two series of angularly adjustable, counter rotating, convex, curvlinear surfaces, each of said surfaces in each of said series positioned to feed an edge of the plastic material behind the center of each succeeding surface, said surfaces being in non-contacting relationship with the center of successive surfaces in each of said series lying alternatively above and below the horizontal plane defined by said plastic material.

2. An apparatus as defined in claim 1 wherein the convex, curvilinear surfaces are balls.

3. An apparatus as defined in claim 1 wherein there are at least two convex, curvilinear surfaces in each series.

4. In an apparatus for stretching flat plastic material, edge-engaging means for progressing and stretching said material comprising two series of angularly and vertically adjustable, counter rotating, convex, curvilinear surfaces each of said surfaces in each of said series positioned to feed an edge of the plastic material behind the center of each succeeding surface, said surfaces being in non-contacting relationship with the center of successive surfaces in each of said series lying alternatively above and below the horizontal plane defined by said plastic material.

5. In an apparatus for stretching flat plastic material, edge-engaging means for progressing and stretching said material comprising two series of angularly adjustable, counter rotating, convex, curvilinear surfaces, each of said surfaces in each of said series having their axis of rotation substantially parallel and positioned to feed an edge of the plastic material behind the center of each succeeding surface, said surfaces being in non-contacting relationship with the center of successive surfaces in each of said series lying alternatively above and below the horizontal plane defined by said plastic material.

6. In an apparatus for stretching flat plastic material, edge-engaging means for progressing and stretching said material comprising two series of angularly and vertically adjustable counter rotating, convex, curvilinear surfaces in non-contacting relationship with the centers of successive surfaces in each of said series lying alternatively above and below the horizontal plane defined by the plastic material, with the axis of rotation of each of said surfaces in each of said series being substantially parallel and each of said surfaces in each of said series positioned to feed an edge of the plastic material behind the center of each succeeding surface.

7. In an apparatus for stretching flat plastic material edge-engaging means for progressing and stretching said material comprising two series of counter rotating, convex, curvilinear surfaces which are angularly adjustable with respect to the plastic material and are vertically adjustable with respect to each other and are positioned in non-contacting relationship with the center of successive surfaces in each of said series lying alternatively below and above the horizontal plane defined by the flat plastic material, each of said surfaces in each of said series feeding an edge of the plastic material behind the center of each succeeding surface at an increasing rate of speed.

8. An apparatus for stretching a travelling flat plastic material comprising pivotable frame members opening in a path divergent to the travelling plastic material, edge-engaging means for progressing and stretching said plastic material comprising two series of convex, curvilinear surfaces mounted on said frame members and being angularly adjustable with respect to said plastic material, said convex, curvilinear surfaces in non-contacting relationship with the centers of successive surfaces in each of said series lying alternatively above and below the horizontal plane defined by the travelling flat plastic material, each of said surfaces in each of said series positioned to feed an edge of the plastic material behind the center of each succeeding surface, and means to rotate the surfaces lying above the said horizontal plane in a direction counter to the direction of rotation of surfaces lying below said horizontal plane.

9. An apparatus for stretching travelling flat plastic material comprising pivotable frame members opening in a path divergent to the travelling plastic material, edge-engaging means for progressing and stretching said plastic material mounted on said frame members and being angularly adjustable with respect to said plastic material, said edge-engaging means comprising two series of convex, curvilinear surfaces in non-contacting relationship with the centers of succeessive surfaces in each of said series lying alternatively above and below the horizontal plane defined by the travelling plastic material each of said surfaces in each of said series positioned to feed an edge of the plastic material behind the center of each succeeding surface, and means to rotate surfaces lying above said horizontal plane in a direction counter to the direction of rotation of surfaces lying below said horizontal plane, said means driving corresponding surfaces in each series at equal speeds and driving each succeeding surface at an increasing rate of speed, the plastic material on being frictionally driven over and under successive surfaces at an increasing rate of speed in a path divergent with respect to the longitudinal center line of the travelling plastic material is stretched in both the longitudinal and transverse directions.

10. An apparatus for stretching travelling flat plastic material comprising pivotable frame members opening in a path divergent to the travelling plastic material, edge-engaging means for progressing and stretching said plastic material mounted on said frame members, being angularly adjustable with respect to said plastic material and being vertically adjustable with respect to each other, said edge-engaging means comprising two series of convex, curvilinear surfaces in non-contacting relationship with the axis of rotation of each of said surfaces in each of said series being substantially parallel, the centers of successive surfaces in each of said series lying alternatively above and below the horizontal plane defined by the plastic material and each of said surfaces in each of said series positioned to feed an edge of the plastic material behind the center of each succeeding surface, and means to rotate surfaces lying above said horizontal plane in a direction counter to the direction of rotation of surfaces lying below said horizontal plane, said driving means corresponding surfaces in each series at equal speeds and driving each succeeding surface at an increasing rate of speed, the plastic material on being frictionally driven over and under successive surfaces at an increasing rate of speed in a path divergent with respect to the longitudinal center line of the travelling plastic material is stretched in both the longitudinal and transverse directions.

References Cited in the file of this patent

UNITED STATES PATENTS 2,767,435     Alles _____ Oct. 23, 1956

FOREIGN PATENTS 400,597     Great Britain _____ Oct. 23, 1933